US008711097B2

(12) United States Patent
Westerweck et al.

(10) Patent No.: US 8,711,097 B2
(45) Date of Patent: Apr. 29, 2014

(54) OPTICAL NAVIGATION DEVICE WITH IMAGE SENSOR AND INNER HOUSING

(75) Inventors: Lothar Westerweck, San Jose, CA (US); Stephen C. Arnold, Honeoye Falls, NY (US); John D. Griffith, Rochester, NY (US); Heidi L. Hall, Webster, NY (US); Srinivas T. Rao, Saratoga, CA (US)

(73) Assignee: DigitalOptics Corporation, San Jose, CA (US)

( * ) Notice: Subject to any disclaimer, the term of this patent is extended or adjusted under 35 U.S.C. 154(b) by 514 days.

(21) Appl. No.: 12/623,420

(22) Filed: Nov. 22, 2009

(65) Prior Publication Data

US 2011/0122060 A1 May 26, 2011

(51) Int. Cl.
*G06F 3/033* (2013.01)
*G09G 5/00* (2006.01)

(52) U.S. Cl.
USPC ........................................................ 345/166

(58) Field of Classification Search
None
See application file for complete search history.

(56) References Cited

U.S. PATENT DOCUMENTS

| 6,707,027 | B2 * | 3/2004 | Liess et al. | 250/221 |
|---|---|---|---|---|
| 7,244,925 | B2 | 7/2007 | Xie | |
| 7,557,338 | B2 | 7/2009 | Gruhlke et al. | |
| 7,825,895 | B2 * | 11/2010 | Bynum et al. | 345/156 |
| 2004/0095321 | A1 | 5/2004 | Sun et al. | |
| 2006/0131487 | A1 | 6/2006 | Mathis et al. | |
| 2007/0296699 | A1 | 12/2007 | Bohn et al. | |
| 2008/0062131 | A1 | 3/2008 | Chan et al. | |
| 2008/0231600 | A1 * | 9/2008 | Smith | 345/166 |

FOREIGN PATENT DOCUMENTS

| CN | 101031868 A | 9/2007 |
|---|---|---|
| CN | 2012 18933 Y | 4/2009 |
| JP | 2005 528682 A | 9/2005 |
| JP | 2007 528554 A | 10/2007 |
| WO | WO 03 102717 A2 | 12/2003 |
| WO | WO 2005 088435 A1 | 9/2005 |

OTHER PUBLICATIONS

Amepelite.com Greenhouse Lexan Thermoclear Product Description Webpage, archived Oct. 23, 2009, http://web.archive.org/web/20091023124458/http://www.ampelite.com.au/thermocleargp.htm.*

(Continued)

*Primary Examiner* — Daniell L Negron
(74) *Attorney, Agent, or Firm* — Larry E. Henneman, Jr.; Gregory P. Gibson; Henneman & Associates PLC

(57) ABSTRACT

An optical navigation device that can sense the movement of an object, such as a user's finger, so that the movement can control a feature of a consumer digital device such as a cursor on a display screen. The device includes a substrate to which an LED, reflector, and image sensor are attached. Light from the LED is directed by the elliptical reflector toward and through a window that is transparent to the light from the LED and then is reflected off of the user's finger back through the window, through a lens, and onto the image sensor. The reflector is positioned to direct light toward the window at an oblique angle, in the range of 65 to 70 degrees from an angle normal to the window. Further, the reflector is curved to gather light across a large solid angle in the vicinity of the LED. The curved shape of the reflector may be a portion of an ellipsoid and the LED may be located at one of the foci of the ellipsoid, with the window located at the other foci of the ellipsoid.

27 Claims, 6 Drawing Sheets

(56) References Cited

OTHER PUBLICATIONS

Ampelite Polycarbonate Multi-wall Sheet Data Sheet, archived May 11, 2005.*
CN Application No. 201010505078.0, Office Action dated Nov. 21, 2012.
CN Application No. 201010505078.0, Office Action dated Jun. 21, 2013 (English translation).
JP Application No. 2010-190783, Office Action dated Nov. 14, 2013 (English translation).

* cited by examiner

OPTICAL NAVIGATION DEVICE WITH IMAGE SENSOR AND INNER HOUSING

BACKGROUND

Pointing devices for controlling the position of a cursor on a display of an electronic device are well known. Such devices include an external mouse, a trackpad, a joystick, a pointing stick, a trackball, and so forth. Just as trackballs may have originated from turning over a mechanical mouse so that the mouse remained stationary while the ball was moved with the user's hand, it has also recently become known to provide for cursor navigation with the movement of a finger or other object above a surface on the electronic device, such as if an optical mouse had been turned over, held in a fixed position, and allowed to sense the movements of a user's finger above the optical sensor. Such devices may be referred to as optical joysticks or optical finger navigation devices.

It is against this background that the teachings herein have been developed.

SUMMARY

Disclosed herein is an optical navigation device that is operable to move a cursor based on movement of an object. The device includes a light source having a top surface from which light is emitted; a curved reflector located adjacent to the light source and positioned above the top surface of the light source to gather and reflect light from the light source in a first direction; an object surface located in the first direction from the reflector, the object surface being transparent to the light from the light source and through which the light reflected by the reflector is directed and which can be reflected back through the object surface by an object located above the object surface; a lens located below the object surface to gather and direct light passing back through the object surface after being reflected off of the object, the light being directed in a second direction; and an image sensor located in the second direction from the lens to receive light reflected off of the object and directed by the lens.

The light source may emit near infrared light. The light source may emit light having a wavelength in the range of 850 nanometers. The reflector may have the shape of a portion of a rotated conic section. The reflector may have the shape of a portion of an ellipsoid and the light source may be located at one of the foci of the ellipsoid. The reflector may be composed of a curved surface having a reflective coating applied thereto. The curved surface may be formed in a plastic member. The object surface may be composed of polycarbonate resin thermoplastic.

The device may further include an aperture stop located between the object surface and the lens. The lens may include a first lens surface on a side of the lens facing toward the object surface and a second lens surface on a side of the lens facing toward the image sensor. The first lens surface may be a conic surface. The second lens surface may be an aspheric surface. The first lens surface may be a conic surface and the second lens surface may be an aspheric surface.

The device may further include a housing surrounding the image sensor allowing light to pass from outside the housing to the image sensor only through the lens. The device may further include a substrate to which the light source, the reflector, and the image sensor are attached. The device may further include an outer housing of which the object surface is a part thereof. The outer housing may be attached to the substrate.

The object surface may be one surface of a window and wherein both the window and the lens may be fabricated from materials which transmit in the spectral region of the LED and reject ambient light outside the spectral region of the LED. Each of the window and the lens may be composed of Lexan. The window and the lens may be each composed of a material that has a different transmittance curve than the other, so that the combined transmittance of the window and the lens is very low at substantially all wavelengths of light below approximately 770 nm. The window may include Lexan 121-21051 and the lens may include Lexan 121-31142. The first direction may be at an angle relative to a direction normal to the object surface, the angle being in the range of 60 to 75 degrees, in the range of 65 to 70 degrees, or in the range of approximately 67 degrees.

Also disclosed is an optical navigation device that is operable to move a cursor based on movement of an object. The device includes a light source having a top surface from which light is emitted; a curved reflector located adjacent to the light source and positioned above the top surface of the light source to gather and reflect light from the light source in a first direction, wherein the curved reflector has the shape of a portion of an ellipsoid and the light source is located at one of the foci of the ellipsoid; an outer housing having a window located in the first direction from the reflector, the window being transparent to the light from the light source and through which the light reflected by the reflector is directed and which can be reflected back through the window by an object when located above the window; a lens located below the window to gather and direct light passing back through the window after being reflected off of the object, the light being directed in a second direction; an image sensor located in the second direction from the lens to receive light reflected off of the object and directed by the lens; a substrate to which the light source, the reflector, and the image sensor are attached; and an inner housing that is in contact with the substrate so as to, in combination with the substrate, surround the image sensor, the housing having an opening defined therein that is located relative to the lens so as to allow light to pass from outside the housing to the image sensor only through the lens.

DETAILED DESCRIPTION

Figure 1:
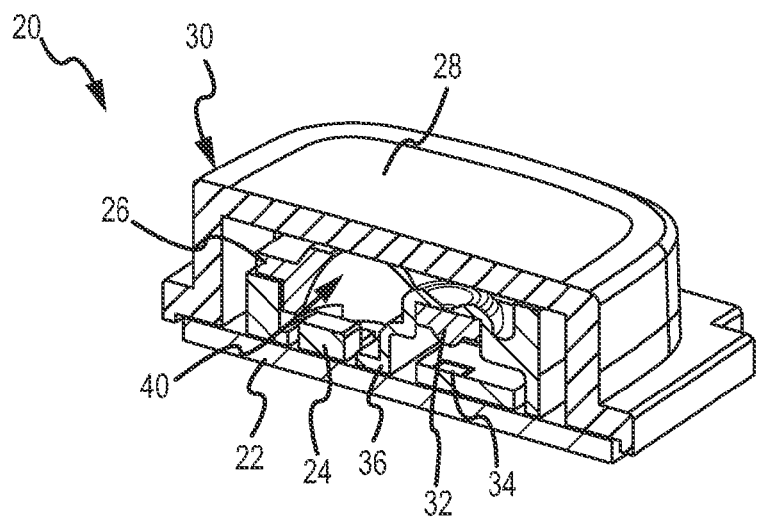
FIG. 1 is a cross-sectional perspective view of an optical navigation device.

While the embodiments of the invention are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims.

Figure 2:
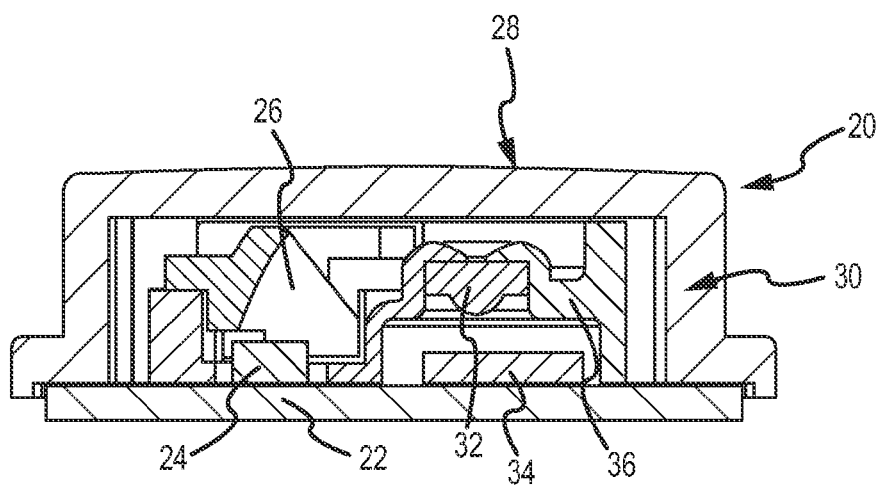
FIG. 2 is a cross-sectional front view of the optical navigation device of FIG. 1.
Figure 3:
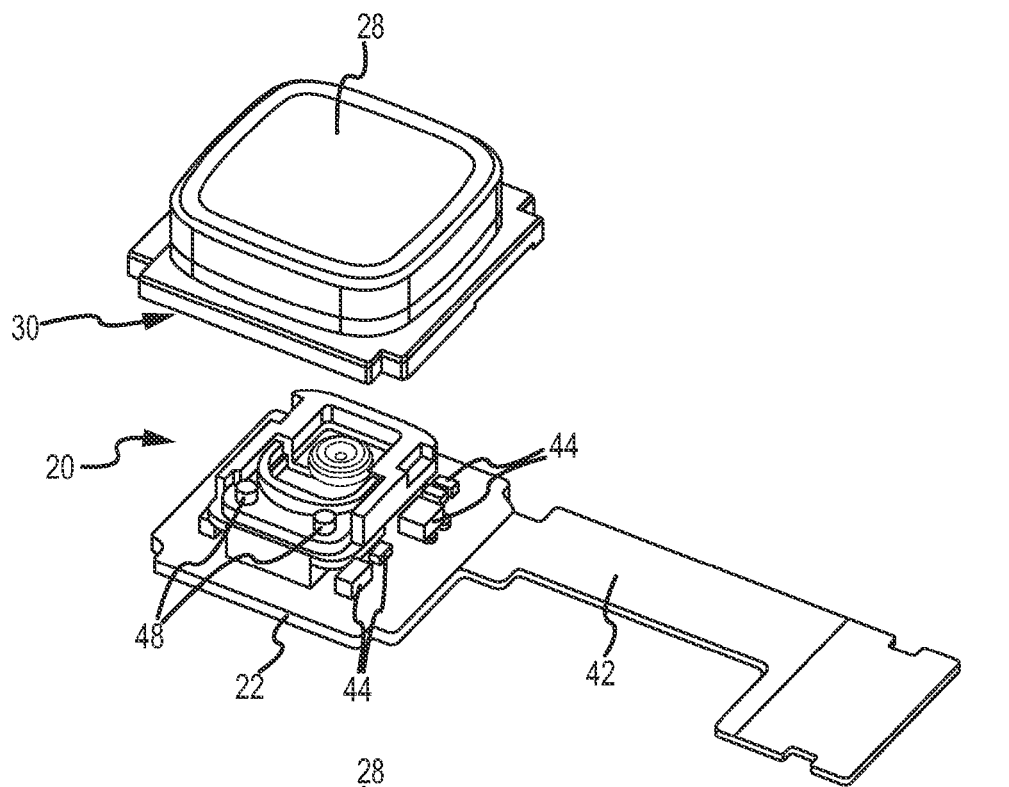
FIG. 3 is a partially exploded perspective view of the optical navigation device of FIG. 1.

An optical navigation device 20 is shown in FIGS. 1 and 2. The device 20 includes a substrate 22, to which an LED 24 is attached. A curved reflector assembly 26 receives light from the LED 24 and reflects and directs it toward a transparent window 28 provided in an external housing 30 for the device 20. A finger of a user (not shown) can be placed against the window 28 to reflect light toward an objective lens 32 that is positioned above an image sensor 34 attached to the substrate 22. The objective lens 32 is retained in place by a lens holder housing 36 that is attached to the substrate 22 and which, together with the substrate 22, completely surrounds the image sensor 34 so that light can only pass through to the image sensor 34 via the lens 32. A flexible printed circuit (FPC) 42 is electrically connected to the LED 24 and image sensor 34, and is shown in FIG. 3.

Figure 6:
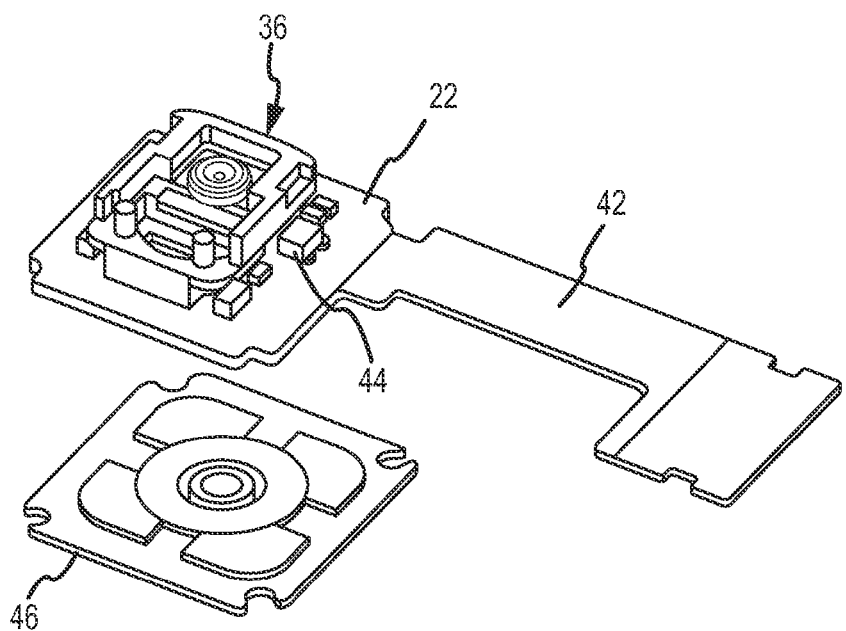
FIG. 6 is a partially exploded perspective view of the optical navigation device of FIG. 1, showing a dome switch on the bottom of the device.
Figure 7:
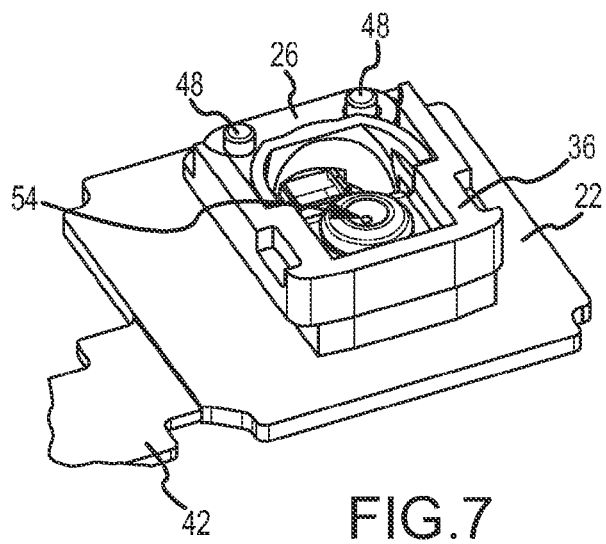
FIG. 7 is a perspective view of selected portions of the optical navigation device of FIG. 1.
Figure 8:
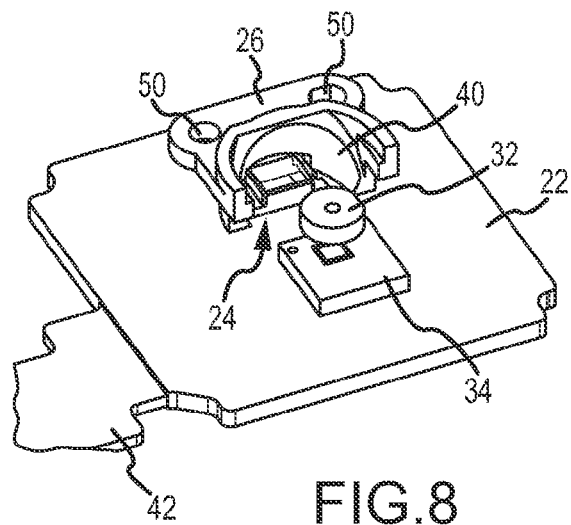
FIG. 8 is a perspective view of selected portions of the optical navigation device of FIG. 1.

The substrate 22 may be any suitable substrate, but one suitable material may be the rigid portion of a rigid FPC (which may also be known as a flexi-rigid FPC, or any FPC that includes both rigid and flexible portions). Further, it may be a traditional PCB type material like FR4 or it could be an FPC with a stiffener attached thereto. By employing a rigid material for the substrate 22, the relative positioning of the LED 24, reflector, 26, lens 32, and sensor 34 can be maintained. In addition, it may be specified by companies purchasing optical navigation devices that the bottom of the device have a rigid surface onto which a dome switch 46 (FIG. 6) or other suitable switch may be mounted such as may be needed in the consumer digital product that the optical navigation device 20 is to be incorporated into.

The LED 24 in this device 20 may an IR LED that emits light in the range of 850 nm. Similarly, the window 28 may be a material that is transparent to light in the range of 850 nm and reflects or absorbs light of other colors. One example of such a material is a polycarbonate resin thermoplastic such as Lexan™ 121-21051, which happens to be a material that primarily absorbs light of other wavelengths. Any other suitable color or wavelength for the LED and for the passband of the window could be used. There may be some advantages to the use of wavelengths outside of the visible spectrum as much of the light in artificial light and sunlight can be blocked from entering the device 20. One example of an LED that may be incorporated into the device 20 is one from Unity Opto Technology. The LED 24 may be soldered to the substrate 22 or attached in any other suitable manner.

The reflector 26 has a portion thereon with a reflective surface 40. The reflective surface 40 can be created by applying a suitable reflective coating (e.g., aluminum, chrome, or other), metal foil, or other to a suitable curved surface formed on the reflector 26. Alternatively, the reflective surface 40 could be composed of a suitable metal or other suitable material. The reflector 26 may have other portions that allow it to be accurately and easily positioned relative to the LED 24, lens 32, and sensor 34. Alternatively, the reflector 26 and the lens holder housing 36 may be combined into a single housing/reflector. The reflector 26 may be composed of any suitable material. It may be desirable for it to be formed from plastic in order to be lightweight, inexpensive, and capable of forming so that the curved surface has a very specific shape. It may also be formed from other suitable materials.

The shape of the reflective surface 40 helps to gather light rays emitted from the LED 24 in many different directions and to direct those different light rays in the direction of the window 28. One example of a suitable shape for the reflective surface 40 is a portion of an ellipsoid (an ellipse that has been rotated about its major axis). By placing the LED 24 generally at one of the foci of the ellipse, the light rays reflected by the reflector 26 will generally pass through the other foci of the ellipse (as is well known, the foci are two special points on the major axis of the ellipse, the singular term being focus). By designing the shape and position of the reflector 26 and relative positioning of the window 28, the reflective surface 40 can be constructed so that the other foci of the ellipse is generally in the vicinity of an upper surface of the window 28, where the user's finger may be placed. This will result in a great deal of the reflected light being directed to the window 28 for potential reflection off of the finger. In one embodiment, the ellipsoidal reflector 26 has a radius of curvature of 0.605 mm and a conic constant of −0.85.

It may be advantageous for the light from the LED/reflector to impinge the finger from an oblique angle relative to the image sensor 34 so as to increase the contrast on the surface of the finger which may improve the ability of the image sensor to image the surface shape of the finger (such as the fingerprint of the user). For example, the light may generally be directed from the reflector 26 in a cone centered about an angle that is in the range of 60 to 75 degrees from a central axis of the image sensor 34 that passes through the lens 32 and is normal to the surfaces of the window 28. More specifically, the angle may be in the range of 65 to 70 degrees from the central axis or even more specifically in the range of 67 degrees. The orientation of the reflector 26 to the LED 24 may be selected to optimize the uniformity of light illuminating the window 28.

The external housing 30 may be formed so as to (when in contact with the substrate 22) prevent light from passing from the exterior into the interior of the housing except via the window 28. The window may have dimensions of 6×6×0.6 mm. The housing 30 may be attached to the substrate 20 via any suitable glue or epoxy.

Figure 4:
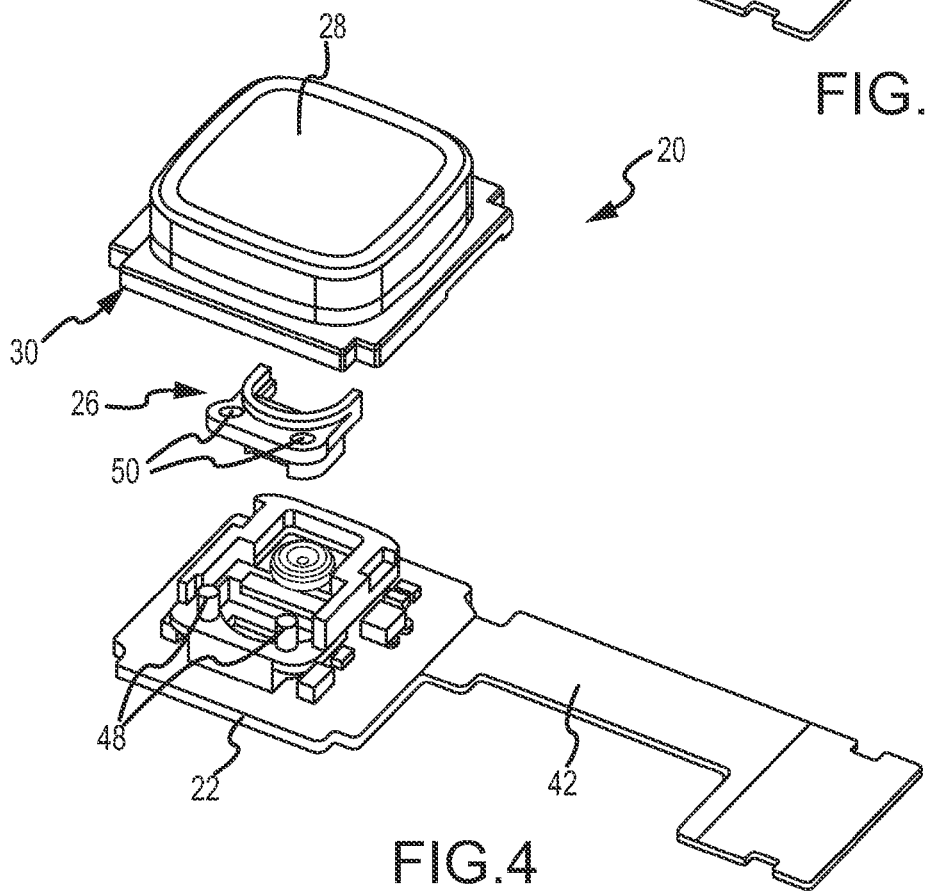
FIG. 4 is a partially exploded perspective view of the optical navigation device of FIG. 1, further exploded than FIG. 3.
Figure 5:
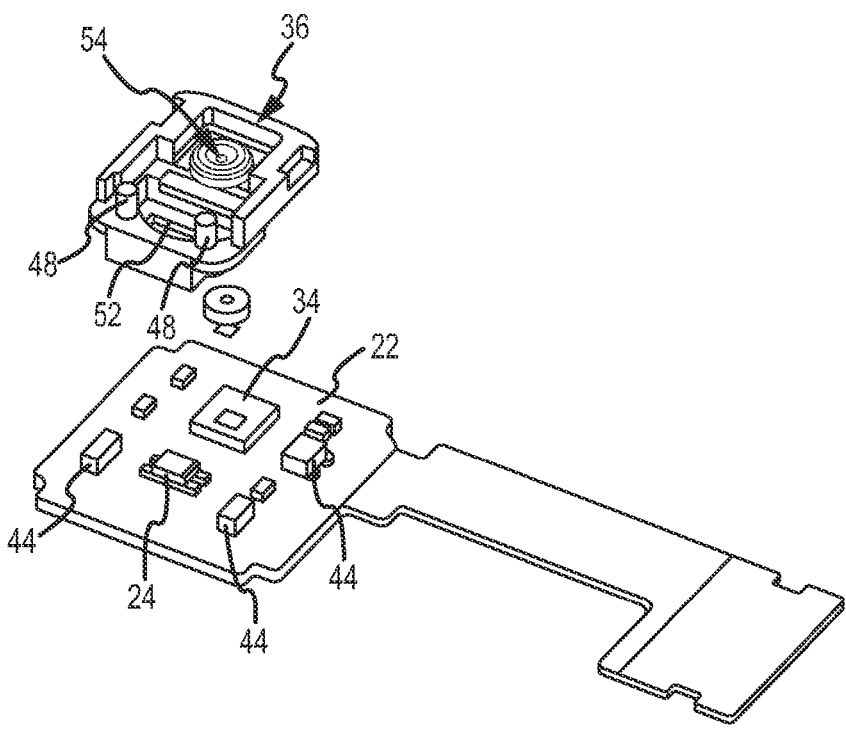
FIG. 5 is a partially exploded perspective view of the optical navigation device of FIG. 1, further exploded than FIG. 4.

The lens holder housing 36 (which may also be referred to as an inner housing) may be composed of any suitable material. It may be desirable for it to be formed from plastic in order to be lightweight, inexpensive, and capable of forming into a very specific shape. It may also be formed from other suitable materials. In one example, shown in FIGS. 3-5, the lens holder housing 36 may include features such as legs 48 that mate with circular openings 50 formed in the reflector 26 in order to accurately control the relative positioning of the reflector 26 and the lens 32. The reflector 26 may be further attached to the lens holder housing 36 via a suitable glue or epoxy and with a suitable curing process (e.g., via a heat stake or ultrasonic welding). Further, the lens holder housing 36 may include an opening 52 formed therein through which portions of the LED 24 are received and/or through which light from the LED 24 passes on the way to the reflector 26. The lens holder housing 36 may include a recessed area that, when the housing 36 has been attached to the substrate 22, prevents light from coming into the recessed area where the image sensor 34 is contained except through a circular opening 54 defined in the top of the lens holder housing. The lens 32 is retained by the lens holder housing 36 in position so that any light entering through the opening 54 will pass through the lens 32. The opening 54 may also serve as the aperture stop for the light passing through to the image sensor 34. Further, the housing 36 may have each of the features described above while at the same time not occluding the illumination of (or creating a shadow on) the window with lens holder housing 36. For example, the lens 32 could be attached to the housing 36 with a UV-cured epoxy or glue (or alternatively could be screwed into the housing 36 via a threaded arrangement). In one embodiment, the lens 32 includes a conic surface on an object side thereof and an aspheric surface on an image side thereof. In this embodiment, the lens may be composed of an absorbing version of an optical polymer such as Lexan™ 121-31142, although any other suitable material could also be used. Further detail on this embodiment of the lens is contained in Table 1 below.

TABLE 1

| PC OBJECTIVE FOR FINGER MOUSE | | | |
|---|---|---|---|
| EFL | 0.44 | N.A. | 0.208 |
| SEMI-FIELD | 42.84(2) | MAG | −0.506 |
| SEMI-DIAG. | 0.43(2) | PARAX IMAGE DIST | 0.516 |
| OBJECT DIST. | 0.001(3) | BEST FOCUS | −0.044 |

PRINCIPAL WAVELENGTH 850
810-890 ACHROMATISM

| SURF. | SEMI-DIAMETER CLEAR APER. | AXIAL BEAM | RADIUS | THICKNESS | GLASS CODE | GLASS NOTE | REF GLASS |
|---|---|---|---|---|---|---|---|
| 1 | 0.854 | | 0.00000 | 0.600 | | (1, 5) | LEXAN121 |
| 2 | 0.531 | | 0.00000 | 0.540 | | | AIR |
| 3 | 0.098* | STOP | 0.69483 | 0.626 | | (1, 5) | LEXAN121 |
| 4 | 0.304 | | −0.26301 | 0.516 | | | AIR |
| 5 | | | 0.00000 | −0.044 | | | IMAGE |

*DO NOT EXCEED $$Z = \frac{CY^2}{1 + \sqrt{1 - (k+1)C^2Y^2}} + DY^4 + EY^6 + FY^8 + GY^{10} + HY^{12} + IY^{14} + JY^{16} + KY^{18}$$

SURF 3 k = −26.08382
D = 0.00000000e+00 E = 0.00000000e+00 F = 0.00000000e+00 G = 0.00000000e+00
H = 0.00000000e+00 I = 0.00000000e+00 J = 0.00000000e+00 K = 0.00000000e+00
SURF 4 k = −0.38561
D = 3.46187384e+00 E = −2.00639182e+01 F = 7.23039552e+02 G = 0.00000000e+00
H = 0.00000000e+00 I = 0.00000000e+00 J = 0.00000000e+00 K = 0.00000000e+00
NOTES:
1) SUBSTITUTE ANY OPTICAL GRADE POLYCARBONATE DEPENDING ON COST AND AVAILABILITY
2) OBJECT SIZE: 1.2 × 1.2 MM. IMAGE SIZE 0.6 × 0.6 MM
3) WV       0.85000      0.81000     0.89000
   LEXAN121 1.57195      1.57332     1.57076
   PUPIL    LOCATION     DIAMETER    ALL DIMENSIONS IN MM
   ENT      0.922        0.196       DESIGNER
   EXIT     −2.988       1.468       ASSIGNMENT light from the LED 24 and reflector 26. The housing 36 may be attached to the substrate 20 via any suitable glue or epoxy (that may include hot or cold processes for curing the epoxy).

The lens 32 may be any suitable lens that can focus the light reflected from the user's finger onto the image sensor 34. The lens 32 may be received within a further recessed area of the One example of an image sensor 34 that may be used in the optical navigation device 20 or other similar devices is the ST VD5376 from STMicroelectronics, although any other suitable image sensor could be used alternatively. The image sensor 34 may have an active area on the top surface thereof and various processing elements therein to perform image processing functions such as algorithms for detecting the movement of the user's finger relative to the device 20. The image sensor 34 may be soldered to the substrate 22 or attached in any other suitable manner.

As can be seen in FIGS. 3-6, a variety of other electrical components 44 may also be soldered (or mounted in any other suitable manner) to the substrate 22. These may include both active and passive components as may be required for operation of the LED 24 and/or image sensor 34.

Figure 9:
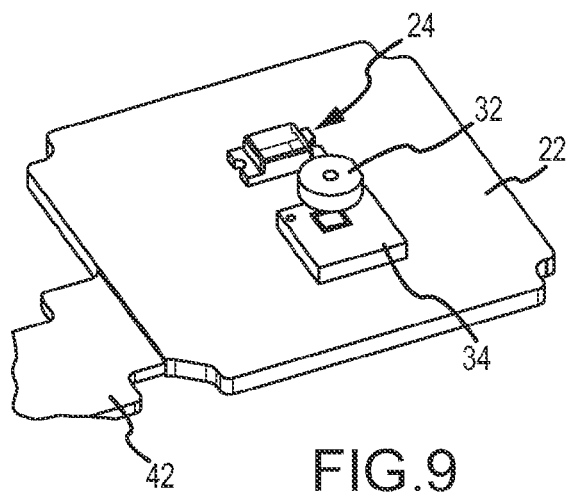
FIG. 9 is a perspective view of selected portions of the optical navigation device of FIG. 1.
Figure 10:
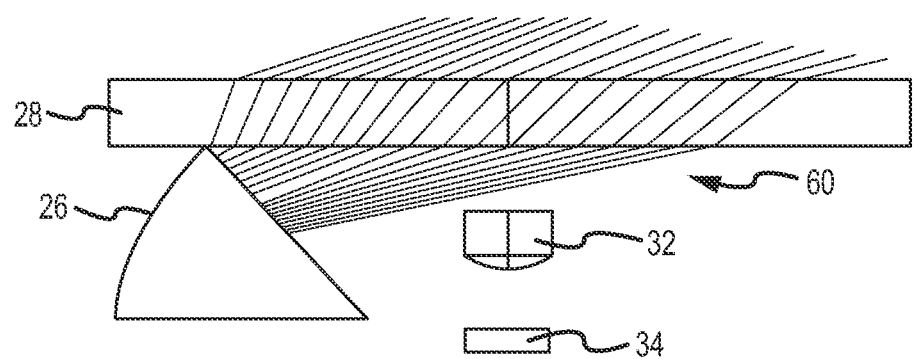
FIG. 10 is a side view of selected portions of the optical navigation device of FIG. 1, showing a plurality of light rays emitted by the LED, and particularly showing a majority of the light rays being reflected in a first general direction.
Figure 11:
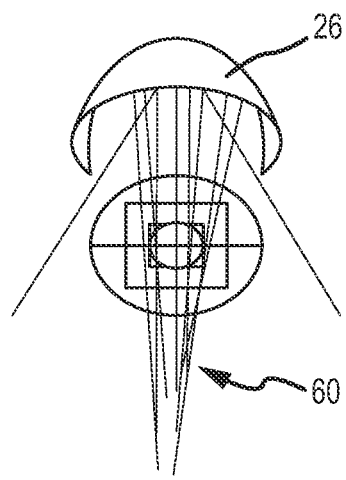
FIG. 11 is a top view of selected portions of the optical navigation device of FIG. 1, showing a plurality of light rays emitted by the LED, and particularly showing a majority of the light rays being reflected in a first general direction.

FIGS. 9 and 10 show how a majority of the light rays 60 emitted by the LED 24 are directed by the reflector 26 in a first direction toward the window 28. It can be seen that although some of the light rays 60 are not reflected off the reflector 26 or are reflected in a direction other than the desired area on the top surface of the window 28, most of the rays are directed in that direction.

Figure 12:
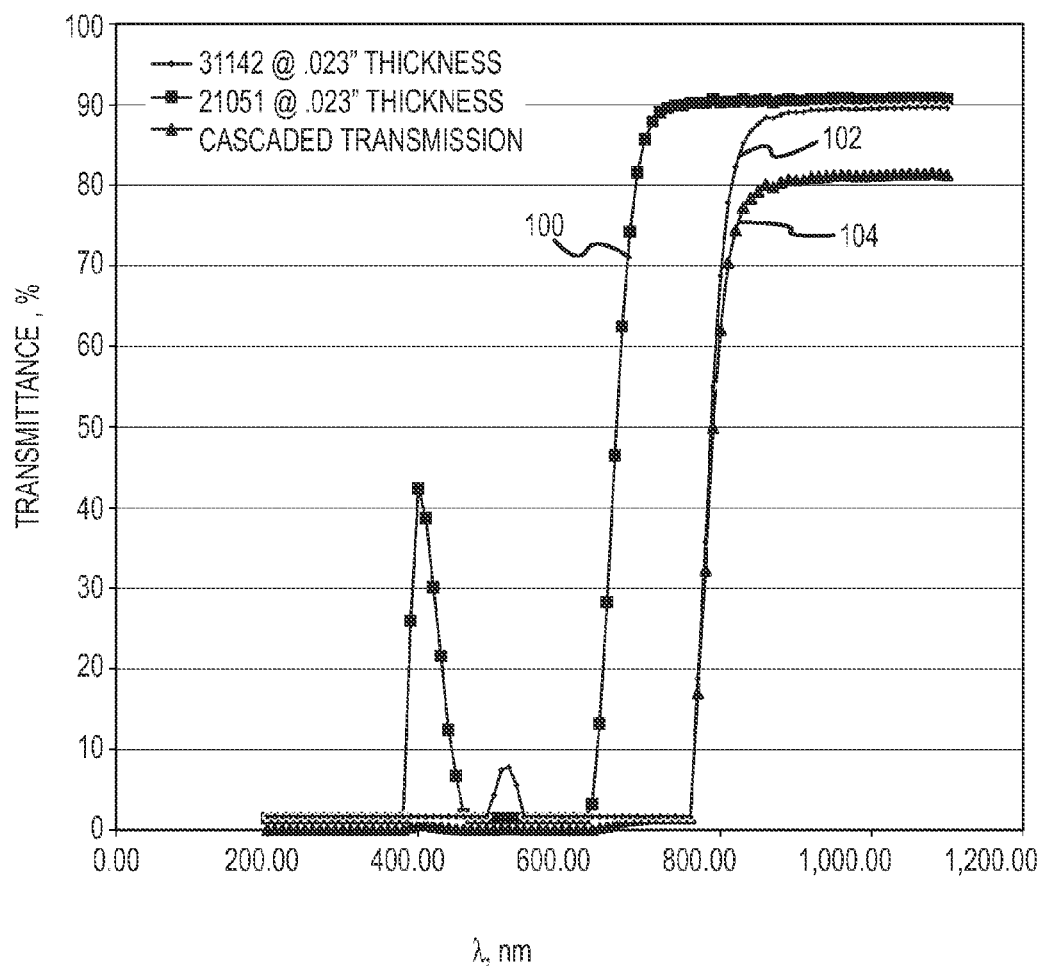
FIG. 12 shows the spectral transmittance of a window and a lens of the optical navigation device of FIG. 1.

FIG. 12 shows three transmittance curves versus wavelength. The first curve 100 is the transmittance of the window 28 versus wavelength. As can be seen, the window 28 has a transmittance of approximately 90% above approximately 700 nm, and below approximately 660 nm the window 28 has a very low transmittance, other than a region in the area of 400 nm where the transmittance spikes up to just over 40%. The second curve 102 is the transmittance of the lens 32 versus wavelength. As can be seen, the lens 32 has a transmittance of approximately 90% above approximately 800 nm, and below approximately 770 nm the lens 32 has a very low transmittance, other than a region in the area of 500 nm where the transmittance spikes up to nearly 10%. The combined, or cascaded, transmittance 104 of the window 28 and lens 32 is shown in the curve 104 which has a transmittance of just over 80% above approximately 820 nm, with very low transmittance below approximately 770 nm. As can be seen, by selecting two different materials for the window 28 and lens 32, the two different materials having different spikes at lower wavelengths, causes the combined transmittance of the two optical components 28 and 32 to be very low below the wavelengths emitted by the LED 24. This helps to keep stray light from outside the device 20 from reaching the image sensor 34.

One of the principal advantages of the device 20 disclosed herein is the tight volume and dimensional constraints that the device meets. Specifically, leaving aside the FPC 42, the device 20 may fit within a volume in the range of 6.5×6.5× 2.24 mm or less. This could not easily be done (with acceptable performance) with the light pipes and prisms of the prior art, and is achieved in part through the use of the ellipsoidal reflector 26. It was found that attempting to use a lightpipe in a device within this volume constraint might require a lens to collimate light from the LED into the light pipe. Even with this extra optical element, there were issues with total internal reflection within the light pipe as well as uneven illumination of the targeted 1.2×1.2 mm area on the upper surface of the window 28.

By way of comparison, the device described herein with the ellipsoidal reflector provides light gathering power over a larger solid angle relative to the LED, redirecting the bulk of the light into an oblique bundle that can penetrate the window toward the user's finger, illuminating the finger with a reasonably uniformly illuminated field, and permitting the placement of the LED and image sensor within the volume constraint.

While the embodiments of the invention have been illustrated and described in detail in the drawings and foregoing description, such illustration and description is to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

The invention claimed is:

1. An optical navigation device that is operable to move a cursor based on movement of an object, the device comprising:
   an outer housing;
   a light source having a top surface from which light is emitted;
   a curved reflector located adjacent to the light source and positioned above the top surface of the light source to gather and reflect light from the light source in a first direction;
   an object surface located in the first direction from the reflector, the object surface being transparent to the light from the light source and through which the light reflected by the reflector is directed and which can be reflected back through the object surface by an object located above the object surface;
   a lens located below the object surface to gather and direct light passing back through the object surface after being reflected off of the object, the light being directed in a second direction that is not parallel to the first direction;
   a multi-pixel image sensor located in the second direction from the lens to receive light reflected off of the object and directed by the lens; and
   an inner housing surrounding the image sensor and located within the outer housing, the inner housing allowing light to pass from outside the inner housing to the image sensor only through the lens; and
   wherein the light source and the reflector are located outside a portion of the inner housing that surrounds the image sensor.

2. A device as defined in claim 1, wherein the light source emits near infrared light.

3. A device as defined in claim 1, wherein the light source emits light having a wavelength in the range of 850 nanometers.

4. A device as defined in claim 1, wherein the reflector has the shape of a portion of a rotated conic section.

5. A device as defined in claim 1, wherein the reflector has the shape of a portion of an ellipsoid and the light source is located at one of the foci of the ellipsoid.

6. A device as defined in claim 1, wherein the reflector is composed of a curved surface having a reflective coating applied thereto.

7. A device as defined in claim 6, wherein the curved surface is formed in a plastic member.

8. A device as defined in claim 1, wherein the object surface is composed of polycarbonate resin thermoplastic.

9. A device as defined in claim 1, further including an aperture stop located between the object surface and the lens.

10. A device as defined in claim 1, wherein the lens includes a first lens surface on a side of the lens facing toward the object surface and a second lens surface on a side of the lens facing toward the image sensor.

11. A device as defined in claim 10, wherein the first lens surface is a conic surface.

12. A device as defined in claim 10, wherein the second lens surface is an aspheric surface.

13. A device as defined in claim 10, wherein the first lens surface is a conic surface and the second lens surface is an aspheric surface.

14. A device as defined in claim 1, further including a substrate to which the light source, the reflector, and the image sensor are attached.

15. A device as defined in claim 1, wherein the object surface is a part of the outer housing.

16. A device as defined in claim 15, wherein the outer housing is attached to the substrate.

17. A device as defined in claim 1, wherein the object surface is one surface of a window and wherein both the window and the lens are fabricated from materials which transmit in the spectral region of the light source and reject ambient light outside the spectral region of the light source.

18. A device as defined in claim 17, wherein each of the window and the lens are composed of Lexan.

19. A device as defined in claim 18, wherein the window and the lens are each composed of a material that has a different transmittance curve than the other, so that the combined transmittance of the window and the lens is very low at substantially all wavelengths of light below approximately 770 nm.

20. A device as defined in claim 18, wherein the window includes Lexan 121-21051 and the lens includes Lexan 121-31142.

21. A device as defined in claim 1, wherein the first direction is at an angle relative to a direction normal to the object surface, the angle being in the range of 60 to 75 degrees.

22. A device as defined in claim 1, wherein the first direction is at an angle relative to a direction normal to the object surface, the angle being in the range of 65 to 70 degrees.

23. A device as defined in claim 1, wherein the first direction is at an angle relative to a direction normal to the object surface, the angel being in the range of approximately 67 degrees.

24. A device as defined in claim 1, wherein the light source is an LED.

25. An optical navigation device that is operable to move a cursor based on movement of an object, the device comprising:
    a light source having a top surface from which light is emitted;
    a curved reflector located adjacent to the light source and positioned above the top surface of the light source to gather and reflect light from the light source in a first direction, wherein the curved reflector has the shape of a portion of a non-spherical ellipsoid and the light source is located at one of the foci of the ellipsoid;
    an outer housing having a window located in the first direction from the reflector, the window being transparent to the light from the light source and through which the light reflected by the reflector is directed and which can be reflected back through the window by an object when located above the window;
    a lens located below the window to gather and direct light passing back through the window after being reflected off of the object, the light being directed in a second direction;
    a multi-pixel image sensor located in the second direction from the lens to receive light reflected off of the object and directed by the lens;
    a substrate to which the light source, the reflector, and the image sensor are attached; and
    an inner housing that is in contact with the substrate so as to, in combination with the substrate, surround the image sensor, the housing having an opening defined therein that is located relative to the lens so as to allow light to pass from outside the housing to the image sensor only through the lens; and
    wherein the light source and the reflector are located outside of a portion of the inner housing that surrounds the image sensor.

26. A device as defined in claim 25, wherein the outer housing is attached to the substrate.

27. An optical navigation device that is operable to move a cursor based on movement of an object, the device comprising:
    an outer housing;
    a light source having a top surface from which light is emitted;
    a curved reflector located adjacent to the light source and positioned above the top surface of the light source to gather and reflect light from the light source in a first direction;
    an object surface located in the first direction from the reflector, the object surface being transparent to the light from the light source and through which the light reflected by the reflector is directed and which can be reflected back through the object surface by an object located above the object surface;
    a lens located below the object surface to gather and direct light passing back through the object surface after being reflected off of the object, the light being directed in a second direction;
    a multi-pixel image sensor located in the second direction from the lens to receive light reflected off of the object and directed by the lens; and
    an inner housing surrounding the image sensor and located within the outer housing, the inner housing allowing light to pass from outside the inner housing to the image sensor only through the lens; and
    wherein the first direction is at an angle relative to a direction normal to the object surface, the angle being in the range of 60 to 75 degrees; and
    wherein the light source and the reflector are located outside a portion of the inner housing that surrounds the image sensor.

* * * * *